(12) United States Patent
McMahon

(10) Patent No.: US 8,383,840 B1
(45) Date of Patent: *Feb. 26, 2013

(54) EXTRACTION OF FULVIC MINERALS, VITAMINS, AMINO ACIDS, ENZYMES, AND PHYTONUTRIENTS FROM HUMIC SUBSTANCES

(76) Inventor: Geoff McMahon, Farmington, NM (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/905,284

(22) Filed: Oct. 15, 2010

Related U.S. Application Data

(63) Continuation-in-part of application No. 11/155,449, filed on Jun. 15, 2005, now Pat. No. 7,825,266.

(51) Int. Cl.
*C07D 319/00* (2006.01)
*C05F 11/02* (2006.01)

(52) U.S. Cl. ............. 549/359; 71/24; 71/64.1; 426/531
(58) Field of Classification Search .................. 549/359; 71/24, 64.1; 426/531
See application file for complete search history.

(56) References Cited

U.S. PATENT DOCUMENTS

| | | |
|---|---|---|
| 2,027,766 A | 1/1936 | Royall et al. |
| 2,992,093 A | 7/1961 | Burdick |
| 3,111,404 A | 11/1963 | Karcher et al. |
| 3,321,296 A | 5/1967 | Abbe et al. |
| 3,398,186 A | 8/1968 | Schwartz |
| 3,418,100 A | 12/1968 | Cooley et al. |
| 3,544,296 A | 12/1970 | Karcher |
| 3,630,710 A | 12/1971 | Frederickson |
| 3,872,002 A | 3/1975 | Musgrove |
| 3,985,536 A | 10/1976 | Abbe et al. |
| 4,069,034 A | 1/1978 | Hoover |
| 4,459,149 A | 7/1984 | Moran et al. |
| 4,778,602 A | 10/1988 | Allen, III |
| 4,786,307 A | 11/1988 | Marihart |
| 4,861,481 A | 8/1989 | Allen, III |
| 5,178,661 A | 1/1993 | van der Watt et al. |
| 5,451,240 A | 9/1995 | Trowbrdige |
| 5,466,273 A | 11/1995 | Connell |
| 6,080,220 A | 6/2000 | Sequi et al. |
| 6,147,229 A | 11/2000 | Rasmussen et al. |
| 6,204,396 B1 | 3/2001 | Rasmussen |
| 6,461,399 B1 | 10/2002 | Connell |
| 6,471,741 B1 | 10/2002 | Reinbergen |
| 6,478,946 B1 | 11/2002 | Westwood |
| 6,695,892 B1 | 2/2004 | Fischer et al. |
| 6,696,577 B1 | 2/2004 | Westwood |
| 7,825,266 B1 * | 11/2010 | McMahon .................... 549/359 |
| 2002/0124613 A1 | 9/2002 | Sower |
| 2002/0174697 A1 | 11/2002 | Reid et al. |
| 2004/0065127 A1 | 4/2004 | Connell |

FOREIGN PATENT DOCUMENTS

| | | |
|---|---|---|
| EP | 000117223 A1 | 8/1984 |
| KR | 2002-0042013 | 6/2002 |

* cited by examiner

*Primary Examiner* — Wayne Langel
(74) *Attorney, Agent, or Firm* — Samantha A. Updegraff; Jeffrey D. Myers; Peacock Myers, P.C.

(57) ABSTRACT

The present invention provides a method for extracting fulvic minerals, vitamins, amino acids, enzymes, and phytonutrients from complexes of humic substances. The fulvic minerals, vitamins, amino acids, enzymes, and phytonutrients extracts are safe for human and animal consumption and for application to plant foliage. As a result of the extraction method, the fulvic minerals, vitamins, amino acids, enzymes, and phytonutrients extracts further comprise calcium and may comprise magnesium.

14 Claims, No Drawings

EXTRACTION OF FULVIC MINERALS, VITAMINS, AMINO ACIDS, ENZYMES, AND PHYTONUTRIENTS FROM HUMIC SUBSTANCES

CROSS-REFERENCE TO RELATED APPLICATION

This application is a continuation-in-part application of U.S. patent application Ser. No. 11/155,449, entitled "Extraction of Fulvic Minerals from Humic Substances", to Geoff McMahon, filed on Jun. 15, 2005, and the specification and claims thereof are incorporated herein by reference.

This application claims the benefit of the filing of U.S. Provisional Application No. 60/580,070 entitled "Extraction of Fulvic Acids from Humic Substances", filed Jun. 15, 2004, and the specification of that application is incorporated herein by reference.

BACKGROUND OF THE INVENTION

1. Field of the Invention (Technical Field)

The present invention relates to a method for extracting fulvic minerals, vitamins, amino acids, enzymes and phytonutrients from complexes of humic substances.

2. Description of Related Art

Humic substances, hereinafter also referred to collectively as humic material, are characterized as high molecular weight heterogeneous organic substances that are the components of soils and sediments. Specifically, they are the compounds of which humus is comprised. They are widespread and generally found in areas where there has been dense prehistoric plant growth. They are understood to play an important role in many geo-chemical reactions and processes including the transport of metal ions, contribution to the cation and anion exchange capacity of peat, soil, and water, the water holding capacity of soil, and the binding of various organic molecules.

Because they play a vital role in soil ecosystems, humic substances are considered to be necessary constituents of soil, both for healthy plant growth and for the nutrition of livestock. The practice of agriculture, however, depletes soils of nutrients. It is generally believed that there is widespread mineral nutrient depletion in farm and range soils. Consequently, humic substances are introduced to agricultural soils as fertilizer.

In recognition that humic substances are superior fertilizers, there is an interest in the direct application of some of these substances to plants, and of feeding these to animals. Also, the vitamin and mineral supplement industry is utilizing these substances to supplement human diets that are believed to be deficient in these substances because of their increasingly diminishing concentrations in produce.

Several components of humic substances are believed to be especially beneficial. Some of these components include humic acid, fulvic minerals, vitamins, amino acids, enzymes, and phytonutrients. These are operationally defined in terms of their solubility. Humic acid is the fraction of humic substances that is not soluble in water under acidic conditions but is soluble in water under alkaline conditions. Fulvic minerals comprise the fraction of humic substances that are soluble under all pH conditions.

It is believed that because fulvic minerals, vitamins, amino acids, enzymes, and phytonutrients molecules are of a relatively small size, they are more readily absorbed by plants and can carry trace minerals from plant surfaces into plant tissues. Therefore, fulvic minerals, vitamins, amino acids, enzymes, and phytonutrients may be sprayed onto plants to maximize the productive capacity of plants. Fulvic minerals, vitamins, amino acids, enzymes, and phytonutrients also benefit humans and can be taken orally in liquid form, or can be applied directly to the skin.

However, the methods currently employed for extracting fulvic minerals, vitamins, amino acids, enzymes, and phytonutrients from the other humic substances result in liquids with high pH containing such compounds as phosphoric acid or sulfuric acid. One method, for example, comprises the addition of phosphoric acid or sulfuric acid to a humic substance material in water. A method is needed to extract fulvic minerals, vitamins, amino acids, enzymes, and phytonutrients in a solution that can be safely consumed by humans and animals and/or sprayed on foliage.

BRIEF SUMMARY OF THE INVENTION

One of the embodiments of the present invention provides a method for extracting fulvic minerals, vitamins, amino acids, enzymes, and phytonutrients. The method includes putting humic substances in an aqueous solution, adding to the aqueous solution a basic compound to increase the pH of the aqueous solution, wherein the basic compound is safe to humans and animals. The pH is then dropped preferably by allowing the solution to sit. The supernatant is then removed. The supernatant comprises a fulvic mineral, vitamin, amino acid, enzyme, and phytonutrient fraction in a basic solution. The fulvic mineral, vitamin, amino acid, enzyme, and phytonutrient fraction in the basic solution is safe for consumption and/or application to foliage.

According to another embodiment of the present invention, increasing the pH of the solution comprises raising the pH to between approximately 8.0 and 14, more preferably to a pH of between approximately 8.5 and 14, still more preferably to a pH of between approximately 9.0 and 14.0, and most preferably to a pH of between approximately 10.0 and 14.0.

Yet another embodiment of the present invention provides for raising the pH of the solution by adding calcium hydroxide. The pH may be increased by adding lime. The pH may be increased by adding calcium hydroxide with magnesium hydroxide.

Preferably, allowing the pH to drop comprises allowing the pH to drop to between approximately 5.5 and 8.5. More preferably, the pH is allowed to drop to between approximately 6.5 and 9.0.

Another embodiment of the present invention provides for a composition comprising fulvic minerals, vitamins, amino acids, enzymes, and phytonutrients extracted from humic substances and calcium. The composition preferably further comprises magnesium. The composition is safe for human and animal consumption and is applicable to plant foliage.

Another embodiment of the present invention provides for a composition consisting essentially of fulvic minerals, vitamins, amino acids, enzymes, and phytonutrients extracted from humic substances and calcium, wherein the composition is safe for human and animal consumption and is applicable onto plant foliage. The composition preferably further consists essentially of magnesium.

The vitamins are preferably selected from the group consisting of: cyanocobalamin (B12), niacin (B3), calciferol (D2), phylloquinone (K), retinol and beta carotene (A), thiamine (B1), tocopherol (E), riboflavin (B2), pyridoxine (B6), and combinations thereof.

The amino acids are preferably selected from the group consisting of: alanine, glutamic acid, glycine, histidine, isoleucine, methionine, phenylalanine, serine, threonine, tryptophan, valine, and combinations thereof.

The phytonutrients are preferably selected from the group consisting of: chlorophyll, allyl sulfides, quercetin, limonene, lutein, catehin, sulphoraphane, lycopene, ellagic acid, resveratrol, anthocyanins, and combinations thereof.

It is an object of the invention to provide an extract comprising one or more of the following: fulvic minerals, vitamins, amino acids, enzymes, and phytonutrients. The extract is safe for human and animal consumption and for application onto foliage.

It is another object of the invention to provide an extract comprising one or more of the following: fulvic minerals, vitamins, amino acids, enzymes, and phytonutrients. The extract also comprises certain nutrients such as calcium and magnesium Other objects, advantages and novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Humic material is typically buried approximately six inches to approximately thirty feet beneath the surface of the ground. In order to reach the humic material, the top surface of the ground is removed, and the humic material is mined. The humic material is removed from the ground, milled, crushed, separated by particle size, dried, and finally micronized. The micronizing process grounds the humic material to a power-like consistency with a small particle size. After micronizing, the humic material is preferably 400 mesh or less in particle size. Once the humic material is micronized, it is ready for extraction.

One embodiment of the present invention provides a method for extracting fulvic minerals, vitamins, amino acids, enzymes, and phytonutrients from complexes of humic substances. In the preferred embodiment of the invention, a complex of humic substances, or humic substances material, is placed in an aqueous solution, preferably utilizing water. The pH of the solution is then increased.

In another embodiment of the present invention, the pH is increased to between approximately 8.0 and 14.0, more preferably from between approximately 8.5 and 14.5, still more preferably from between approximately 9.0 and 14.0, and most preferably between approximately 10.0 and 14.0. Preferably, this is accomplished by the addition of calcium hydroxide. In another embodiment, lime may be utilized. In still another embodiment, magnesium hydroxide may be introduced together with the calcium hydroxide.

When the desired pH is reached, the solution is allowed to sit preferably undisturbed in a still state with no mixing, stirring, or agitating. In other words, the pH is allowed to drop naturally over time without any disturbance to the solution such as, for example, mixing, adding reagents or other materials, or changing the temperature or stirring. While the pH of the solution is dropping naturally over time, it is preferred that no other material, solution, component, reagent, liquid, acid, base, solid or the like is added to the solution. When the pH drops, the supernatant is removed. Preferably, the supernatant is removed when a pH of between approximately 5.5 and 8.5 is reached, more preferably when a pH of between approximately 6.5 and 9.0 is reached. The supernatant comprises the fulvic mineral, vitamin, amino acid, enzyme, and phytonutrient fraction in solution with calcium hydroxide. The fraction solution may then be safely consumed or applied to foliage.

The present invention not only provides for the separation of fulvic minerals, vitamins, amino acids, enzymes, and phytonutrients from the other humic substances material compounds, but also provides for the presence of essential nutrients, such as, but not limited to, calcium and magnesium (if magnesium hydroxide is utilized), in the resulting product.

The amino acids recovered from the extraction can include, but are not limited to: alanine, glutamic acid, glycine, histidine, isoleucine, methionine, phenylalanine, serine, threonine, tryptophan, and valine.

The vitamins recovered from the extraction can include, but are not limited to: cyanocobalamin (B12), niacin (B3), calciferol (D2), phylloquinone (K), retinol and/or beta carotene (A), thiamine (B1), tocopherol (E), riboflavin (B2), and pyridoxine (B6).

The phytonutrients recovered from the extraction can include but are not limited to: chlorophyll, allyl sulfides, quercetin, limonene, lutein, catehin, sulphoraphane, lycopene, ellagic acid, resveratrol, and anthocyanins. Many different types of enzymes are also extracted.

EXAMPLE

Extracts of fulvic minerals, vitamins, amino acids, enzymes, and phytonutrients were obtained using the methods of the present invention. The extract proved safe for animal and human consumption and contained calcium and magnesium as a consequence of the methods of extraction.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. A method for extracting fulvic minerals, vitamins, amino acids, enzymes, and phytonutrients comprising:
    putting humid substances in an aqueous solution;
    adding to the aqueous solution a basic compound to increase the pH of the aqueous solution, wherein the basic compound is safe to humans and animals;
    dropping the pH naturally over time by allowing the solution to sit; and
    removing a supernatant comprising a fulvic mineral, vitamin, amino acid, enzyme, and phytonutrient fraction in a basic solution; and providing the fulvic minerals, vitamins, amino acids, enzymes, and phytonutrients in the basic solution for safe consumption by humans and animals and/or application to foliage.

2. The method of claim 1 wherein the step of increasing the pH of the solution comprises raising the pH to between approximately 8.0 and 14.

3. The method of claim 1 wherein the step of increasing the pH of the solution comprises raising the pH to between approximately 8.5 and 14.

4. The method of claim 1 wherein the step of increasing the pH of the solution comprises raising the pH to between approximately 9.0 and 14.

5. The method of claim 1 wherein the step of increasing the pH of the solution comprises raising the pH to between approximately 10.0 and 14.

6. The method of claim 1 wherein the pH of the solution is increased by adding calcium hydroxide.

7. The method of claim 1 wherein the pH of the solution is increased by adding lime.

8. The method of claim 1 wherein the pH the solution is increased by adding calcium hydroxide and magnesium hydroxide.

9. The method of claim 1 wherein allowing the step of allowing the pH to drop comprises allowing the pH to drop to between approximately 5.5 and 8.5.

10. The method of claim 1, wherein the step of allowing the pH to drop comprises allowing the pH to drop to between approximately 6.5 and 9.0.

11. The method of claim 1 wherein the basic compound is selected from the group consisting of: calcium hydroxide, magnesium hydroxide, and combinations thereof.

12. The method of claim 1 wherein the vitamins are selected from the group consisting of: cyanocobalamin (B12), niacin (B3), calciferol (D2), phylloquinone (K), retinol and beta carotene (A), thiamine tocopherol (B1), riboflavin (B2), pyridoxine (B6), and combinations thereof.

13. The method of claim 1 wherein the amino acids are selected the group consisting of: alanine, glutamic acid, glycine, histidine, isoleucine, methionine, phenylalanine, serine, threonine tryptophan, valine, and combinations thereof.

14. The method of claim 1 wherein the phytonutrients are selected from the group consisting at: chlorophyll, allyl sulfides, quercetin, limonene, lutein, catehin, sulphoraphane, lycopene, ellagic acid, resveratrol, anthocyanins, and combinations thereof.

* * * * *